Figure 1:
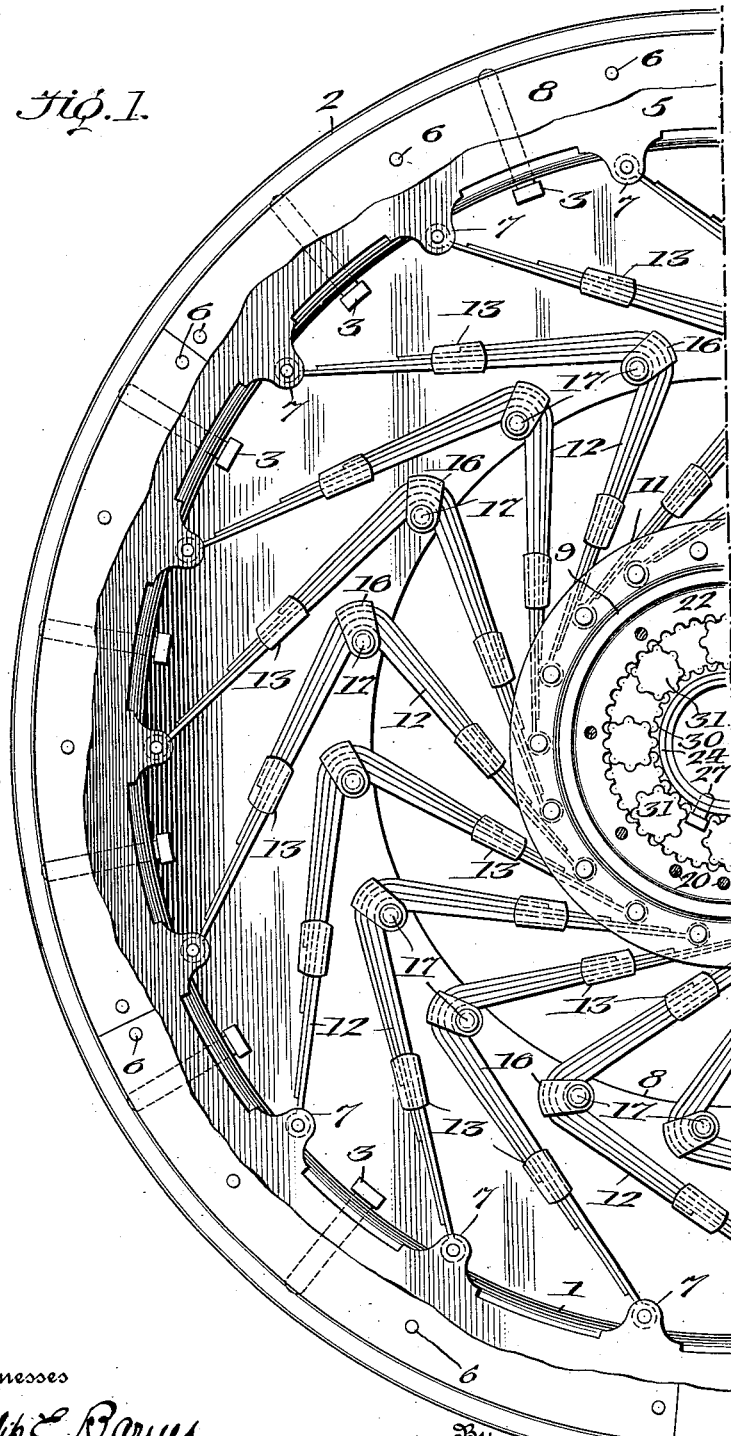

J. E. SACKETT.
WHEEL.
APPLICATION FILED AUG. 11, 1913.

1,095,600.

Patented May 5, 1914.
2 SHEETS—SHEET 1.

Witnesses
Philip C. Barnes
E. J. Sheely

Inventor
J. E. Sackett

By
James J. Sheely & Co., Attorneys

J. E. SACKETT.
WHEEL.
APPLICATION FILED AUG. 11, 1913.
1,095,600.
Patented May 5, 1914.
2 SHEETS—SHEET 2.
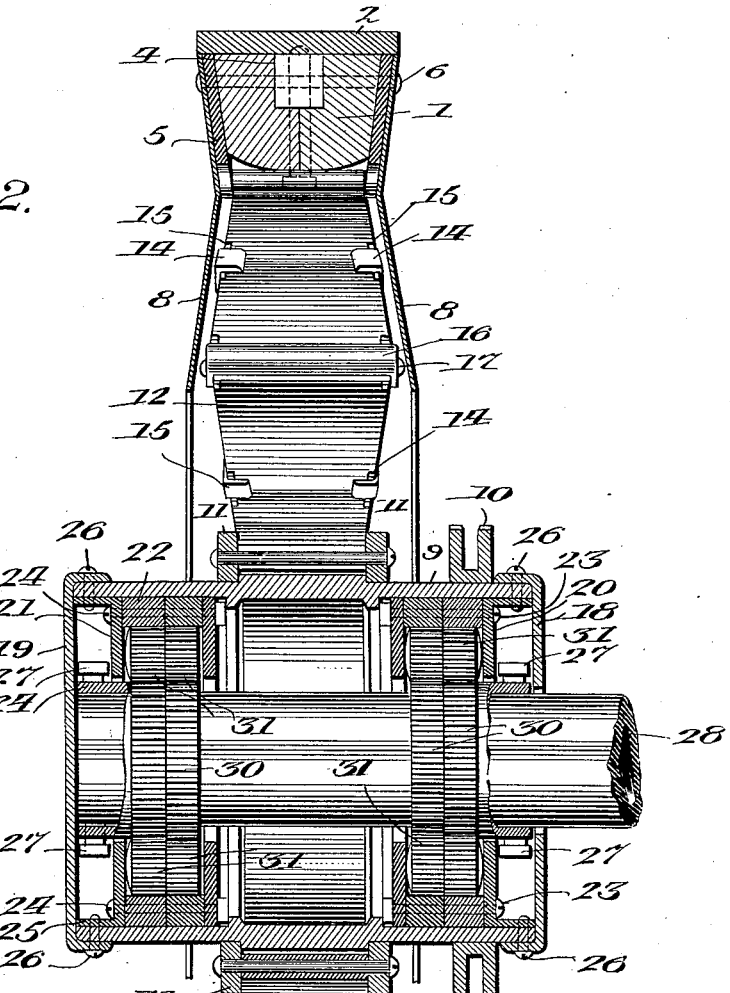
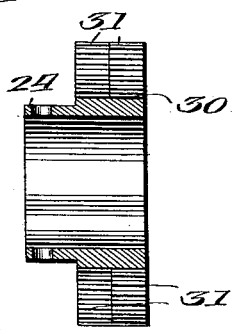
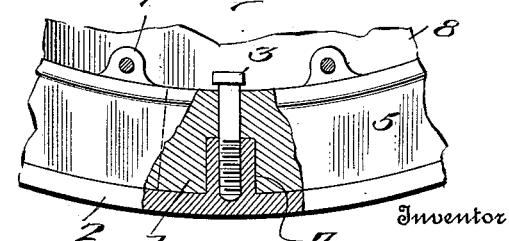
Witnesses
Philip E. Barnes
E. J. Sheeley
Inventor
James E. Sackett
by
James J. Sheeley & Co.
Attorneys

UNITED STATES PATENT OFFICE.

JAMES E. SACKETT, OF MONTICELLO, NEW YORK.

WHEEL.

1,095,600.

Specification of Letters Patent.

Patented May 5, 1914.

Application filed August 11, 1913. Serial No. 784,227.

*To all whom it may concern:*

Be it known that I, JAMES E. SACKETT, citizen of the United States, residing at Monticello, in the county of Sullivan and State of New York, have invented new and useful Improvements in Wheels, of which the following is a specification.

My present invention pertains to wheels and more particularly to wheels for use on the driving shafts or axles of motor vehicles.

One of the objects of the invention is to provide a wheel, especially for the purpose stated, that is simple, compact and strong and is therefore well adapted to withstand the rough usage to which motor vehicle wheels are ordinarily subjected.

Another object is the provision of a spring wheel which is efficient in cushioning a vehicle and yet embodies no parts that are liable to get out of order after a short period of use.

Another object of the invention is the provision of a wheel provided with means for connecting it with a driving shaft or axle in such manner that the wheel will be strongly driven by the shaft or axle when the vehicle is traveling a straight course, and yet when the wheel is the outer wheel during the movement of the vehicle through a part of a circle the wheel will be free to turn independently of the shaft or axle.

The invention in all of its details will be fully understood from the following description and claims when the same are read in connection with the drawings, accompanying and forming part of this specification, in which:

Figure 1 is a side elevation of one half of a wheel constructed in accordance with my invention. Fig. 2 is a detail view, partly in transverse section and partly in elevation, of the same. Fig. 3 is a detail view showing one of the toothed collars that is fixed on the shaft, and the arrangement of the toothed rollers relative to said toothed collar. Fig. 4 is a view of a portion of the wheel rim.

Similar numerals of reference designate corresponding parts in all of the views of the drawings.

The rim of the wheel comprises a wooden felly 1, a metallic tire 2, radial bolts 3 extending through the felly and threaded in the sockets 4 on the tire, and side plates 5 connected through transverse bolts 6 with the felly and having inwardly extending apertured lugs 7. By virtue of said construction the rim is at once simple and strong, and well adapted to withstand the roughest usage. At this point I would have it understood that I also prefer to use the bolts 6 in the connection of the annular skirts 8 which have for their function to exclude dust, stones and other substance from the outer portions of the spaces between the springs hereinafter described.

The hub of the wheel comprises among other elements a cylindrical casing 9, and this latter may when deemed expedient be provided with a sprocket gear 10 through which motion may be imparted directly to the hub. The said hub is also provided with spaced peripheral flanges 11. These latter serve for the pivotal connection of the inner ends of the springs, the outer ends of which are disposed between and pivotally connected to the rim-lugs 7, the said relative arrangement enabling the flanges 11 and the lugs 7 to effectually hold the springs against movement transversely of the wheel, and this without in any measure detracting from the capacity of the springs to flex in a radial direction. Each of the springs is of general V-shape in side elevation, and each comprises a plurality of leaves or laminations 12, clips 13 straddling the end portions of the leaves, Figs. 1 and 2, and having inturned end portions 14 and also having their side portions disposed in edge recesses 15 of the leaves, whereby the clips are held against casual movement lengthwise of the leaves, a clip 16 straddling the leaves at the apices of the angles, described thereby, and a transverse bolt 17 connecting the side portions or arms of the clip 16 and snugly disposed in the bight of the innermost leaf of the series and adapted to effectually hold the clip 16 in position on the several leaves and against movement with respect thereto. Springs constructed in the manner shown are highly resilient and at the same time are strong and durable. It will also be appreciated that in the event of any one of the leaves of a spring becoming impaired, the spring can be removed and the impaired leaf readily replaced with a new leaf. At this point I would also have it understood that any number of springs may be employed, and any number of leaves 12 may be comprised in each spring, according to the use to which the wheel is to be put, without affecting my invention and without involving departure from the scope of my appended claims.

Manifestly the annular skirts 8 hereinbefore referred to, will in the event of an accident, serve the additional function of guards to protect the outer portions of the circular series of springs against injury.

In addition to the cylindrical casing 9 the hub of the wheel includes a dust guard 18, a dust cap 19, inner interior spaced flanges 20 connected with the casing 9, outer interior spaced flanges 21 connected with the casing 9, and interiorly toothed rings 22; the said rings 22 being arranged in pairs, and one pair being interposed between the flanges 20 and connected thereto by bolts 23, and the other pair being interposed between the flanges 21 and connected thereto by bolts 24. In the present and preferred embodiment of the invention the innermost flange 20 and the outermost flange 21 are provided with peripheral portions 25, and the said portions 25 are connected by radial bolts 26 with the casing 9, this mode of connection being advantageous since it permits of either pair of interior flanges being readily removed from the casing 9 when occasion demands. It will also be noted that the inner bolts 26 serve for the attachment of the dust guard 18, while the outer bolts 26 serve for the attachment of the dust cap 19.

Arranged within the hub and fixed by set screws 27 to the shaft 28 are collars 29, each of which is provided with two exterior gears 30, the teeth and interdental spaces of the said gears being preferably arranged in staggered relation as shown. The gears 30 are integral with their respective collars, and interposed between each pair of gears 30 and the complementary internal gears or rings 22 are toothed rollers 31; the said rollers 31 each having a portion to engage the gear 30 of one pair and another portion to engage the other gear 30 of the pair.

By virtue of the construction just described, it will be manifest that when the shaft 28 is utilized to transmit motion to the wheel, the wheel will be driven by the shaft so long as the vehicle is traversing a straight course. When, however, the vehicle is moving through a curve, as in turning a corner, and the wheel is the outer wheel of the two on the shaft, the said wheel will be free to move or turn independently of and faster than the shaft.

Notwithstanding the practical advantages hereinbefore ascribed to my novel wheel, it will be noted that because of the simplicity of its construction the wheel is not unduly expensive when its capacity of function is taken into consideration.

When motion is transmitted directly to the hub of the wheel through the medium of the sprocket gear on said hub, it will be manifest that the toothed rollers will serve as anti-friction bearings.

Having described my invention, what I claim and desire to secure by Letters Patent, is:

1. In a wheel, the combination of a rim, a hub, and a plurality of springs arranged in a circular series and interposed between and pivoted to the rim and the hub; each of the said springs being made up of a plurality of leaves that describe angles and are arranged in laminated relation, a clip straddling the leaves at the apices of the angles described thereby, and a bolt connecting the arms of the clip and disposed in the bight of the innermost leaf of the series.

2. In a wheel, the combination of a rim, a hub, and a plurality of springs arranged in a circular series and interposed between and pivoted to the rim and the hub; each of the said springs being made up of a plurality of leaves that describe angles and are arranged in laminated relation and having edge recesses in their arms, a clip straddling the leaves at the apices of the angles described thereby, a bolt connecting the arms of the clip and disposed in the bight of the innermost leaf of the series, and clips straddling the recessed portions of the leaves and disposed in said recesses.

3. In a wheel, the combination of a rim having inwardly directed apertured lugs, a hub having spaced peripheral flanges, and a plurality of springs, each of V-shape in side elevation, pivoted at their inner ends between the hub flanges and at their outer ends between the rim lugs, each of the said springs comprising a plurality of leaves arranged in laminated relation and having recesses, in their arms, a clip straddling the leaves at the apices of the angles described thereby, a bolt connecting the arms of said clip and disposed in the bight of the innermost leaf of the series, and clips straddling the recessed portions of the leaves and disposed in the recesses of the leaves.

In testimony whereof I have hereunto set my hand in presence of two subscribing witnesses.

JAMES E. SACKETT.

Witnesses:
 EDWARD F. RYAN,
 BESSIE M. ROBINSON.